Jan. 7, 1969    J. FISCHER ET AL    3,421,127
MULTIPLE-PART SPOOL, ESPECIALLY FOR RELAYS
Filed March 29, 1967
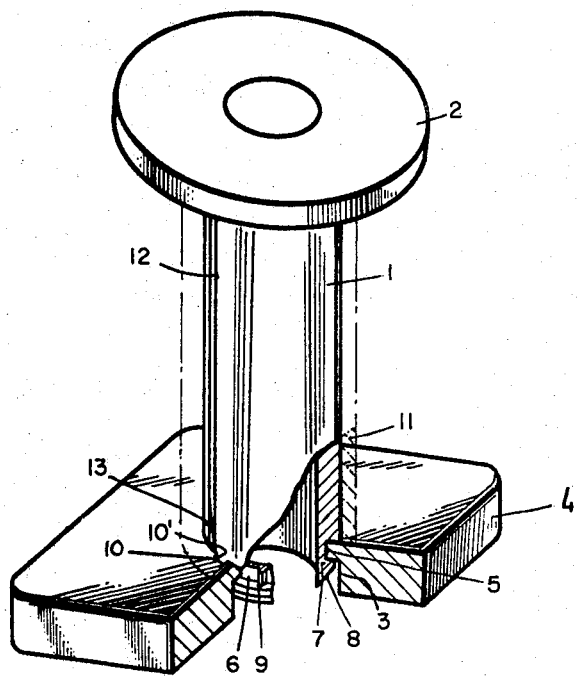
INVENTORS
Josef Fischer
Erwin Müller
BY
ATTYS.

United States Patent Office 3,421,127
Patented Jan. 7, 1969

3,421,127
MULTIPLE-PART SPOOL, ESPECIALLY
FOR RELAYS
Josef Fischer and Erwin Müller, Munich, Germany, assignor to Siemens Aktiengesellschaft, a corporation of Germany
Filed Mar. 29, 1967, Ser. No. 626,744
Claims priority, application Germany, Mar. 31, 1966, S 102,956
U.S. Cl. 336—208                     4 Claims
Int. Cl. H01f 27/30

ABSTRACT OF THE DISCLOSURE

A multiple-part spool particularly for relay coils, utilizing an inner tube and two cooperable end flange members, at least one of which is an individual part and subsequently assembled with the assembled coil and/or copper damping tube, in which at least one end of the tube is provided with a groove in its outer periphery which is adapted to receive a cooperable portion of the flange member to be mounted thereon, at least one of the mating parts comprising a deformable plastic material which may be temporarily deformed sufficiently during assembly to permit the same.

---

The invention relates to a multiple-part spool, particularly for relays, for instance, for retaining a self-supporting coil or copper sleeve.

In manufacturing relays it is often convenient for technical production reasons, to produce, for example, the field coil in a separate operation and then impregnate it with hardening agents, so that it becomes self-supporting. On the other hand, it is customary in relay technology, in order to obtain long operating times, to mount a copper tube directly on the inner tube of a spool. Such a copper tube functions as a short-circuited secondary coil and has a very strong dampening effect on the relay. Since a copper tube or a self-supporting coil can be attached on the inner tube only as a unit, the spools must be built in such a manner that they can be assembled.

Consequently, the inner tubes of relays heretofore have been provided with at least at one milled end so that after the assembly of a self-supporting coil or copper tube on the inner tube, one or two members are attached in a rotationally fixed manner. To prevent the flange members from slipping, the ends of the inner tubes, following attachment of the flanged members, are slightly staked in various places, for example, in three places, about their periphery. This often insignificant enlargement of the outer measurements of the inner tubes is sufficient to prevent the flange member from becoming loose or falling away. In this case the inner tubes of the spools must be provided with a milled edge in a separate operation and after the closed mounting of a spool in another operation, the ends of the inner tubs must be staked.

In order to considerably reduce the cost as well as simplify, and possibly even automatically carry out the manufacture of spools as well as the subsequent mounting thereof, it is provided, in accordance with the invention, that a flange member, having an aperture, following a brief deformation necessary during the attachment process, interlocks in a groove encircling one end of the inner tube of the spool, which end is provided with a beveled outer edge, and that either or both the flange member and tube are constructed from an elastic deformable material.

As a result of such spool construction in accordance with the invention, after attaching a self-supporting coil or copper tube without additional hardening agents, the inner tube can be staked with respect to one or both flange members to provide a unitary structure. Also, the groove can be produced in the inner tube without requiring a separate operation. If the spool is made of thermoplastic material, teeth may be provided in the groove of the inner tube to prevent the flange member from turning relative thereto. Furthermore, longitudinal ribs can be placed on the inner tube to retain the copper tube immovable with respect thereto.

Further details of the invention will be apparent from the constructional example illustrated in the drawing, which is a perspective view of a spool with the lower flange member broken away to show the details of the construction between the flange member and the inner tube of the spool.

In this embodiment, for the sake of simplicity, only one of the flange members is illustrated as being attachably arranged, the inner tube 1 and the upper flange member 2 being constructed in one piece. The beveled lower end of the inner tube is inserted in an aperture 3 of the second flange member 4 and by application of pressure is forced into the aperture until the inwardly directed flange 5 interlocks in a groove 6 formed on the inner tube 1. By this procedure both of the two parts, particularly the inner tube, may be elastically deformed during the assembly of the individually manufactured parts within the permissible limits of the material, which should preferably be a thermoplastic. After the flange 5 interlocks in the groove 6, both parts immediately relax and assume their original measurements. With this construction of the groove and flange, a secure connection of the two parts with respect to each other is assured. The beveled guide edge 8 on the end tube 7 of the inner tube makes the mechanical assembly possible in a simple manner.

If the tolerances between the flange aperture and the groove are so great that the two parts rotate relative to one another, teeth 9 can be disposed in the groove 6 of the inner tube 1 to prevent rotation of the inner tube with respect to the flange member 4 when thermoplastic material is used, which teeth engage the smooth-walled flange 5. If, however, one of the parts, for instance the flange member 4, consists of a harder material, for example, "Duroplast," such teeth are not suitable as a protection against rotation. In this case a guide or keyway groove 10 is provided in the flange member 4, in which is interlocked a projection or key 10' disposed on the inner tube. Since a self-supporting coil or copper tube is to be slid on the inner tube 1 prior to the attachment of the two parts 1 and 4 of the spool, which coil and tube are indicated in the drawing by broken lines. Likewise, since the two parts are not supposed to rotate on the inner tube, longitudinal ribs 12 may be provided, the ends of which, adjacent the groove 6 are tapered or beveled as indicated at 13 to facilitate mounting.

In contrast with the illustrated example, it is possible to provide both ends of the copper tube directly with grooves and beveled guide edges so that manufactured flanges corresponding to the flange member 4 are attachable on both ends. This possibility of dual attachability can be of importance in special types of relays.

Changes may be made within the scope and spirit of the appended claims which define what is believed to be new and desired to have protected by Letters Patent.

We claim:
1. A multiple-part spool, particularly for relay coils, adapted to support a self-supporting coil or copper damping tube, comprising a tube member and two cooperable end flange members, at least one of which is an individual part and subsequently assembled with the tube member following mounting of the components to be supported thereon, said tube member having a peripheral groove therein adjacent the end thereof which is to receive a portion of the individual flange member, such flange member having an opening therein for the receipt of the grooved end of said tube member, the opening in said flange member having a peripheral edge portion which is less in transverse dimensions than the corresponding dimensions of the portion of the tube member between the groove therein and the adjacent end thereof, at least one of such members to be assembled being constructed of a plastic material which is capable of sufficient temporary deformation to enable insertion of the cooperable end of the tube member in the opening of said flange member and interlocking of the latter in said groove, such end of the tube member having a beveled outer peripheral edge.

2. A spool according to claim 1, wherein thermoplastic material is employed and the peripheral edge of the flange member disposed within the groove is smooth-walled, comprising tooth elements carried by said tube member, disposed in said groove and bearing upon the adjacent smooth wall of the flange member, for preventing relative rotation between the interlocked members.

3. A spool according to claim 1, wherein relatively hard materials are employed, in which said individual flange member is provided with a keyway recess in the periphery of the opening therein, said tube member having a radially extending key projection disposed in said keyway opening for preventing relative rotation between the interlocked members.

4. A spool according to any of claim 1, wherein the outer periphery of said tube member is provided with a plurality of longitudinally disposed ribs, for preventing relative movement between said tube member and components to be supported thereon, the ends of said ribs adjacent said groove being beveled to facilitate the assembly of such components thereon.

References Cited
UNITED STATES PATENTS

| | | | |
|---|---|---|---|
| 2,667,624 | 1/1954 | Bels | 336—208 XR |
| 2,956,312 | 10/1960 | Naimer | 336—198 XR |
| 3,253,802 | 5/1966 | Anderson et al. | 242—118.6 |

FOREIGN PATENTS

| | | |
|---|---|---|
| 866,952 | 5/1961 | Great Britain. |
| 956,829 | 4/1964 | Great Britain. |

GEORGE HARRIS, *Primary Examiner.*

U.S. Cl. X.R.

242—118.4